United States Patent [19]
Fleming et al.

[11] Patent Number: 5,694,503
[45] Date of Patent: Dec. 2, 1997

[54] ARTICLE COMPRISING A TEMPERATURE COMPENSATED OPTICAL FIBER REFRACTIVE INDEX GRATING

[75] Inventors: Debra Anne Fleming, Berkeley Heights; David Wilfred Johnson, Jr., Bedminster; Paul Joseph Lemaire, Madison, all of N.J.

[73] Assignee: Lucent Technologies Inc., Murray Hill, N.J.

[21] Appl. No.: 707,879

[22] Filed: Sep. 9, 1996

[51] Int. Cl.$^6$ .................................................. G02B 6/34
[52] U.S. Cl. ............................................................ 385/37
[58] Field of Search .............................. 369/103, 288; 359/2; 250/227.21, 343, 339.02, 227.16; 385/37, 123, 141

[56] References Cited

U.S. PATENT DOCUMENTS

| | | | |
|---|---|---|---|
| 3,971,645 | 7/1976 | Bachmann | 427/167 |
| 5,042,898 | 8/1991 | Morey et al. | 358/37 |
| 5,146,083 | 9/1992 | Zuckerwar et al. | 250/227.21 |
| 5,196,694 | 3/1993 | Berthold et al. | 250/227.16 |
| 5,200,610 | 4/1993 | Zuckerwar et al. | 250/227.21 |
| 5,223,715 | 6/1993 | Taylor | 250/343 |
| 5,258,614 | 11/1993 | Kidwell et al. | 250/227.14 |
| 5,422,873 | 6/1995 | Kewitsch et al. | 359/2 |
| 5,514,360 | 5/1996 | Sleight et al. | 423/593 |
| 5,600,070 | 2/1997 | Wlodarczyk | 73/715 |

OTHER PUBLICATIONS

"Passive Temperature–Compensating Package for Optical Fiber Gratings", by G. W. Yoffe et al., *Applied Optics*, vol. 34(30), Oct. 20, 1995, pp. 6859–6861.

"Negative Thermal Expansion from 0.3 to 1050 Kelvin in $ZrW_2O_8$", by T. A. Mary et al., *Science*, vol. 272, Apr. 5, 1996, pp. 90–92.

"Condensed Phase Relations in the Systems $ZrO_2-WO_2-WO_3$ and $HfO_2-WO_2-WO_3$", by L. L. Y. Chang et al., *Journal of The American Ceramic Society*, vol. 50, No. 4, Apr. 1967, pp. 211–215.

Summary of papers to be given at ECOC '96, Sep. 15–19, 1996, Oslo, Norway, paper Mo B.3.5. (To the best of applicants' knowledge, this summary became available during the week of Jul. 29, 1996–Aug. 2, 1996.).

*Primary Examiner*—Akm E. Ullah
*Attorney, Agent, or Firm*—Eugen E. Pacher

[57] ABSTRACT

Conventional optical gratings are relatively temperature sensitive. This sensitivity is generally undesirable but can be reduced or eliminated by attaching the grating to a support member having a negative coefficient of thermal expansion. Exemplarily the member comprises Zr-tungstate and/or Hf-tungstate. The thermal expansion can be tailored by admixture of positive expansion coefficient material (e.g., $Al_2O_3$, $SiO_2$) to the negative expansion coefficient material (e.g., $ZrW_2O_8$), or by a variety of other techniques.

13 Claims, 2 Drawing Sheets

ARTICLE COMPRISING A TEMPERATURE COMPENSATED OPTICAL FIBER REFRACTIVE INDEX GRATING

FIELD OF THE INVENTION

This invention pertains to articles that comprise an optical fiber refractive index grating, more specifically, to articles that comprise such a grating that is packaged such that its reflection wavelength is substantially temperature independent.

BACKGROUND OF THE INVENTION

Optical fiber refractive index gratings (to be referred to as "fiber Bragg gratings" or simply "gratings") are well known, and are widely used in, e.g., optical fiber communication systems.

A simple, unchirped fiber Bragg grating has a reflection wavelength $\lambda = 2n_{eff}\Lambda$, where $n_{eff}$ is the effective refractive index for the guided optical mode, and $\Lambda$ is the spatial period of the index modulation in the fiber. Both $n_{eff}$ and $\Lambda$ are temperature dependent, with the net temperature dependence for a grating in silica-based fiber exemplarily being about +0.0115 nm/°C. for $\lambda \sim 1550$ nm. The temperature-induced shift in the reflection wavelength typically is primarily due to the change in $n_{eff}$ with temperature. The thermal expansion-induced change in $\Lambda$ typically is responsible for only a relatively small fraction of the net temperature dependence of a grating in a conventional $SiO_2$-based fiber.

In many applications of fiber Bragg gratings it would be highly desirable if the reflection wavelength were relatively temperature-independent. U.S. patent application Ser. No. 08/539,473, filed Oct. 4, 1995 by D. J. DiGiovanni et al., discloses relatively temperature insensitive long period fiber gratings. The temperature insensitivity is attained by appropriate selection of cladding composition in a fiber with multilayer cladding. See also a co-pending co-assigned patent application entitled "Long-Period Fiber Grating Devices Packaged for Temperature Stability" by J. B. Judkins et al. U.S. Pat. No. 5,042,898 discloses apparatus that can provide temperature compensation of a fiber Bragg grating. The apparatus comprises two juxtaposed compensating members that differ with respect to thermal expansion coefficient. Both members have a conventional positive thermal expansion coefficient. The fiber is rigidly attached to each of the members, with the grating disposed between the two attachment points. The apparatus can be designed to apply tensile or compressive stress to the grating. In the latter case the grating is confined in (typically bonded along its length to) a small tube, exemplarily a silica tube. See also G. W. Yoffe et al., *Applied Optics*, Vol. 34(30), p. 6859 (October 1995).

It is typically necessary to fabricate the prior art two-material package with precise tolerances, and to insure that the two (or more) parts that comprise the package remain in extremely tight alignment over the life of the device. Even small shifts can cause unacceptably large changes in tension on the grating, and consequent undesirable wavelength shifts.

Furthermore, the two-member prior art design typically will be considerably longer than the grating, exemplarily at least 50% longer than the grating device, making the prior art design frequently undesirably large.

In view of the need for temperature compensated fiber Bragg gratings, it would be highly desirable to have available a simple and reliable way of providing such compensation and to have available apparatus therefor. This application discloses such apparatus.

Ceramic materials having a negative coefficient of thermal expansion over a wide temperature range are known. See, for instance, T. A. Mary et al., *Science*, Vol. 272, p. 90 (Apr. 5, 1996), and U.S. Pat. No. 5,514,360.

SUMMARY OF THE INVENTION

In a broad aspect the invention is an article (e.g., an optical fiber amplifier, a fiber grating-based WDM device or add/drop multiplexer/de-multiplexer) that comprises a temperature compensated fiber Bragg grating. The grating can be a simple linear grating, but can also be a chirped and/or blazed grating.

More specifically, the article comprises a support member and a length of optical fiber that comprises a fiber Bragg grating having a length and a reflection wavelength $\lambda$ at a given temperature, e.g., 20° C. The optical fiber is attached to the support member. The support member is selected to have a negative coefficient of thermal expansion selected such that $\lambda$ is substantially temperature independent over a temperature range of interest, exemplarily −20° to 65° C.

The reflection wavelength $\lambda$ is "substantially temperature independent" herein if the value of $|d\lambda/dT|$ of the packaged grating is less than 50%, preferably less than 20 or even 10%, of the value of $d\lambda/dT$ of the unpackaged grating at 20° C.

The reflection wavelength $\lambda$ is the wavelength of maximum reflection of the grating.

DETAILED DESCRIPTION OF SOME EXEMPLARY EMBODIMENTS

Figure 1:
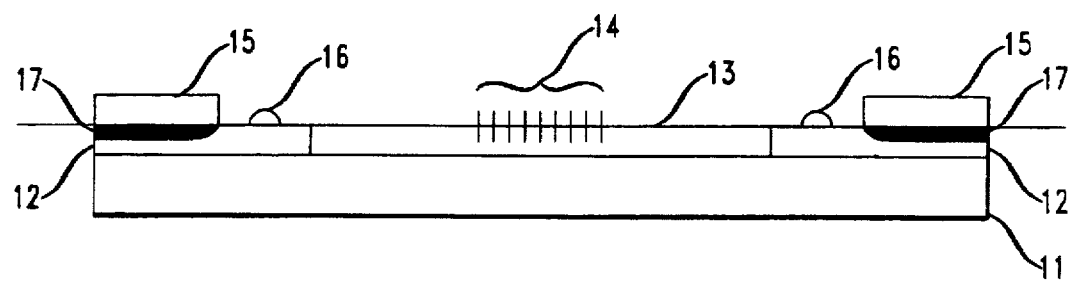
FIGS. 1 and 2 schematically depict exemplary embodiments of the invention.

FIG. 1 schematically depicts an exemplary embodiment of the invention, wherein numerals 11-17 refer, respectively, to the negative thermal expansion substrate, bonding platforms, optical fiber, Bragg grating](schematically indicated by the short transverse lines), optional cover plate, low melting glass or other suitable bonding material, and optional epoxy bond. In this embodiment the grating region of the fiber is not directly attached to the substrate. This requires that the package is assembled such that the grating is under tensile stress throughout the temperature range of interest. This can be accomplished by maintaining the grating under an appropriate tensile stress during attachment of the fiber to the substrate or, generally more preferably, attaching the unstressed fiber to the substrate at a temperature at or above the maximum temperature of interest. As will be understood by those skilled in the art, the bonding material that secures the fiber to the substrate must be able to prevent long term slippage/creep of the bond since, for instance, a mere 0.6 µm length change of a 80 mm grating would result in a 0.01 nm wavelength shift for a 1550 nm grating.

Low melting point glass can provide a low creep bond and is currently preferred as a bonding material. Most preferred is low melting point glass having a low or negative thermal expansion coefficient, to minimize thermal expansion mismatch. The low melting point glass (e.g., phospho-aluminosilicate glass, with or without F for thermal expansion matching) exemplarily is applied as a frit, the substrate with the fiber in place is heated to an appropriate attachment temperature (e.g., 120° C.) above the intended maximum operating temperature of the grating (exemplarily 80° C.), and the frit is then melted by appropriate means, e.g., a CO$_2$ laser, a YAG laser, or a high temperature gas stream. The thus attached fiber will be essentially unstressed at the attachment temperature, and will be under tensile stress at the maximum operating temperature and below (e.g., throughout the range −40° C. to 80° C.).

Low melting point glass is not the only suitable type of bonding material. For instance, low creep metal solder (e.g., Au—Sn solder) can be used in known fashion, as can be organic adhesives (e.g., epoxies). The latter can, however, more preferably be used as secondary bond to isolate the relatively brittle low melting point glass bond from external stresses. The secondary bond is preferably (but not necessarily) made to a coated section of fiber, whereas a low melting point glass or solder bond typically is made to a bare fiber (in the latter case the fiber will frequently be metal coated, as is conventional for solder bonding of optical fiber).

In FIG. 1, the bonding platforms 12 can be integral with, of the same material as, substrate 11, or can be of different material and attached to the substrate by conventional means. Exemplarily the bonding platforms are INVAR(®) blocks, selected to minimize thermal strain on the fiber in the bonding regions. Optionally a fiber-receiving groove is provided in the top surface of the respective bonding platforms. Optionally cover plates 15 are provided and bonded to the bonding blocks. Desirably the cover plates are grooved and are made of the same material as the bonding platforms (e.g., INVAR).

An epoxy bond to a bare fiber (or to a fiber coated with a thin (e.g., thickness ≤65 μm, preferably <30 μm) layer of a high modulus (e.g., elastic modulus ≥3×10$^4$ psi) polymer) can be suitably creep resistant if the epoxy layer is very thin (e.g., 10–20 μm). Exemplarily the epoxy is thermally cured epoxy with glass transition temperature >100° C.

If desired, the assembly of FIG. 1 can be placed in a conventional housing to provide protection to the grating, provided that care is taken not to affect the thermal expansion characteristics of the assembly.

In the assembly of FIG. 1 the grating will typically be substantially free of undesired non-uniform strain, and thus of inadvertent chirp. However, other designs can also offer acceptable performance.

Figure 2:
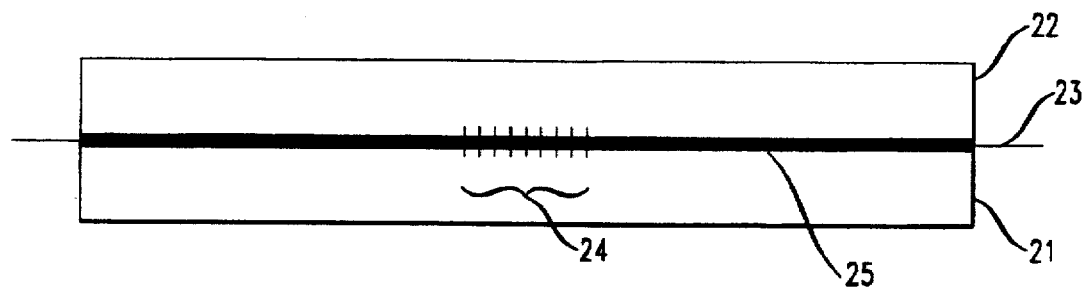

The assembly of FIG. 2 comprises negative thermal expansion substrate 21 and optional cover plate 22. It also comprises fiber 23 with refractive index grating 24 (indicated by short lateral lines), and epoxy bonding material 25. The assembly potentially provides high reliability by increasing the length of the bonding region to the length of the grating. In order to avoid non-uniform fiber strain and consequent detrimental chirping of the grating, it is desirable to use a low thermal expansion epoxy. Such an epoxy can be made by adding finely divided ZrW$_2$O$_8$ (or other negative thermal expansion material) to a conventional epoxy, (e.g., a single component epoxy such as Epo Tek H61, a product available from Epoxy Technology, Billerca, Mass.). For more detail, see the '360 patent. Grating 24 advantageously has a relatively thin (e.g., ≤25 μm) high modulus (e.g.,≥3× 10$^4$ psi) polymer coating to facilitate tight, substantially creep-free coupling to the substrate and the cover plate. Desirably, the substrate and cover plate each have a fiber-receiving groove. If desired, the assembly of FIG. 2 can be enclosed in a conventional housing, keeping in mind the above stated proviso.

The assembly of FIG. 2 does not have to be (but can be) assembled at a temperature ≥ the maximum desired operating temperature, since the fiber with the grating therein is restrained against lateral movement, and thus can support axial compressive strain. The fiber can thus be bonded to the substrate and the cover plate at any convenient temperature, e.g., room temperature. Of course, the bonding material need not be epoxy. For instance, metal solder could be used at least in principle.

We have found that appropriate choice of the support member (e.g., substrate and bonding platform of FIG. 1, or substrate of FIG. 2) can result in substantially complete temperature compensation of the grating. Exemplarily, for a conventional 1550 nm grating in silica-based single mode fiber, essentially complete temperature compensation can be attained if the support member has a thermal expansion coefficient of −9.4×10$^{-6}$/°C. This is obtainable with ZrW$_2$O$_8$.

Published data shows thermal expansion coefficients of −4.7×10$^{-6}$ to −9.4×10$^6$/°C. for ZrW$_2$O$_8$, with the value depending on the temperature range. (See T. A. Mary et al., op. cit., FIG. 1). We have used ZrW$_2$O$_8$ powder to fabricate sintered monoliths of this ceramic material by a conventional technique. The monoliths exhibited a thermal expansion coefficient of about −12.4×10$^{-6}$/°C. These results are indicative of the fact that the material in bulk form can have a range of thermal expansion coefficients, depending on manufacturing conditions. This makes possible tuning of the thermal expansion to yield optimal thermal compensation of a given grating.

Tuning of the thermal expansion is also possible through admixture of an appropriate amount of positive expansion coefficient material (e.g., Al$_2$O$_3$, SiO$_2$, ZrO$_2$, MgO, CaO or Y$_2$O$_3$, typically in powder form) to the negative expansion coefficient material, to decrease the thermal contraction of the resulting sintered body to a desired value. Alternatively, the (negative thermal expansion coefficient) support member can be bonded to an additional member (e.g., Al$_2$O$_3$, SiO$_2$, ZrO$_2$ member) with conventional positive thermal expansion coefficient to yield a combination having a negative expansion coefficient of a desired magnitude.

Many refractive index gratings in conventional silica-based fiber have temperature sensitivities of order 0.011–0.012 nm/°C. at 1550 nm. However, it has also been found that in D$_2$-sensitized fibers, gratings can have temperature sensitivity as high as 0.016 nm/°C. at 1550 nm. Thus, it will be necessary to tune the negative thermal expansion of the support member over a significant range, in order to be able to substantially eliminate the temperature dependence of all the gratings of current interest.

The thermal expansion coefficient of the support member ($\alpha_s$) that can provide for optimal temperature compensation of a given grating is given by the expression $$\alpha_s = -\left(\alpha_g + \frac{1}{n}\frac{\partial n}{\partial T}\right)(1-P_e)^{-1}, \text{ where,} \qquad \text{Equ. 1}$$

$\alpha_g$ is the thermal expansion coefficient of the (unpackaged) given grating, n is the effective refractive index of the grating, T is temperature, and P$_e$ is the photo-elastic constant of the fiber, exemplarily about 0.22 for silica-based fibers.

The above equation inter alia shows that, to first order, $\alpha_s$ does not depend on the Bragg wavelength λ of the grating. Thus, a support member material that is suitable for a 1550 nm grating will generally also be appropriate for a 1310 nm grating.

In order to provide temperature compensation for the gratings of current interest it would be highly desirable to be able to tailor the thermal expansion properties of the support member material (e.g., $ZrW_2O_8$, $HfW_2O_8$), or mixtures thereof.

The value of the negative expansion coefficient of that material exemplarily can be tailored by admixture of positive expansion coefficient material to the negative expansion material. The amount of a given additive that will reduce the (negative value) of the resulting support member material to a desired value is readily determined to first order by the linear mixing rule:

$$\alpha_m = V_1\alpha_1 + V_2\alpha_2, \qquad \text{equ.2}$$

where $\alpha_m$, $\alpha_1$ and $\alpha_2$ are the linear thermal expansion coefficient for the mixture, component 1 and component 2 respectively, and $V_1$ and $V_2$ are the volume fractions of component 1 and component 2 respectively. Manufacture of the ceramic support member from the mixed powders can be conventional.

The expansion coefficient exemplarily can also be tailored by altering the Zr:W ratio in the Zr-tungstate ceramic (i.e., forming material of nominal composition $Zr_{1+x}W_2O_{8\pm\delta}$, where x is in the range $-0.4 \leq x \leq 0.4$, and $\delta$ is a small number (typically $\leq 0.1$) sufficient to satisfy the valence requirements); alloying $ZrW_2O_8$ with Hf, including replacing some of the Zr with Hf; alloying $ZrW_2O_8$ with Mo; including replacing some of W with Mo; heat treatment of $ZrW_2O_8$ ceramic at a temperature in the range 1000° C. to 1350° C., such that partial conversion of $ZrW_2O_8$ to ZrO and $WO_3$ occurs, resulting in a controlled and permanent increase in the expansion coefficient (for details, see Chang et al., *J. American Ceramic Society*, Vol. 50, p. 211); or lamination of a negative expansion coefficient member with a metal or ceramic member having a different expansion coefficient, such that the resultant composite member has the desired net expansion coefficient.

EXAMPLE 1

$ZrW_2O_8$ powder was mixed with a conventional organic binder, and cold pressed into two plate-shaped bodies of approximate lengths 25 mm and 38 mm, respectively. The green plates were sintered at 1200° C. in the air for 4 hours. After cooling to room temperature, the thermal expansion coefficient of the plates was measured by conventional dilatometry and was found to be $-12.4 \times 10^{-6}$ per °C. The plates were ground flat on one surface to insure close tolerances in the assembled package, and a groove was cut lengthwise into the ground surface of the longer of the two plates. The groove served to receive the optical fiber, and was cut by means of a conventional diamond saw.

A silica-based single mode optical fiber with a conventional optical fiber grating of length about 10 mm was placed in the groove such that the uncoated grating section was approximately centered, with coated fiber "pigtails" extending beyond the plates. The assembly was then bonded together with thermally curing epoxy adhesive. A variety of conventional adhesives are suitable for use. The bonding was done over the entire grating length up to and including the coated sections of the fiber pigtails.

Figure 3:
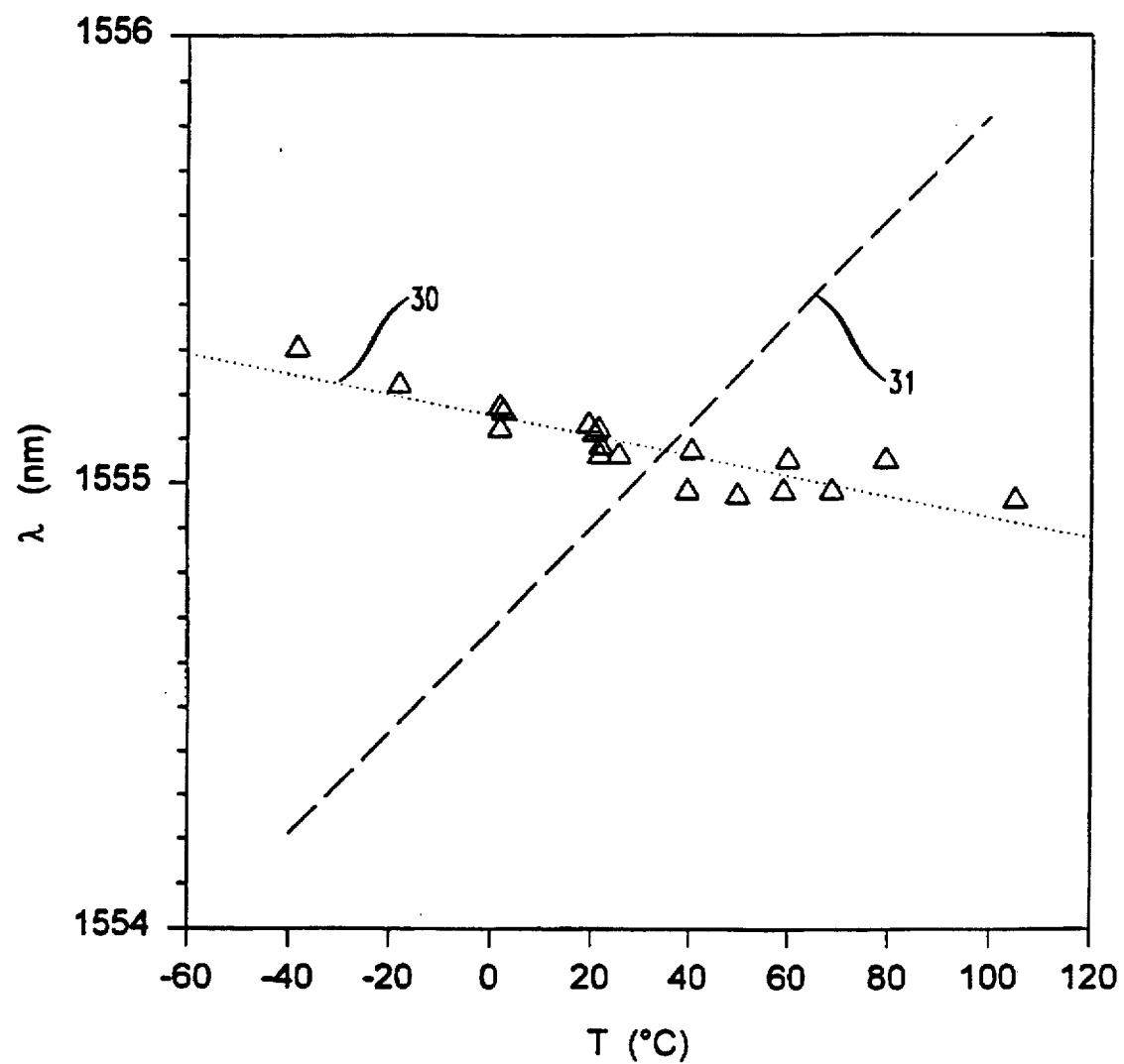
FIG. 3 shows exemplary results.

After curing of the adhesive the performance of the packaged grating was determined in conventional manner. The results are shown in FIG. 3, where curve 30 refers to the packaged grating, and curve 31 refers to an otherwise identical unpackaged grating. The overall temperature dependence of the package grating was found to be $-0.00231$ nm/°C., and that of the unpackaged grating was $+0.0115$ nm/°C. The improvement is significant and evident.

The packaged grating is incorporated into an optical fiber communication system and performs as expected.

EXAMPLE 2

A packaged optical fiber grating is prepared as described above, except that the $ZrW_2O_8$ powder is mixed with $Al_2O_3$ powder. The desired thermal expansion coefficient of the sintered plates is determined by means of equation 1 above, and the approximate volume ratio of $Al_2O_3$ to $ZrW_2O_8$ is determined by means of equation 2 above. The thermal expansion coefficient of the packaged grating is approximately zero.

The invention claimed is:

1. An article comprising an optical fiber with a refractive index grating having a length and a reflection wavelength $\lambda$ at a given temperature within an operating temperature range; wherein the optical fiber is attached to a support member, said support member having a negative coefficient of thermal expansion selected such that $\lambda$ is substantially temperature independent over said operating temperature range.

2. An article according to claim 1, wherein the support member has a negative coefficient of thermal expansion selected such that $|d\lambda/dT|$ is less than 20% of $d\lambda/dT$ of an otherwise identical comparison grating that is not attached to a support member.

3. An article according to claim 1, wherein the operating temperature range includes 20° C.

4. An article according to claim 3, wherein the operating range includes at least a portion of the range $-20°$ to 65° C.

5. An article according to claim 1, wherein the optical fiber is a silica-based optical fiber.

6. An article according to claim 1, wherein the optical fiber is attached to the support member at least over the length of the refractive index grating.

7. Article according to claim 1, wherein said optical fiber is attached to the support member at bonding platforms configured such that said refractive index grating is spaced from said support member.

8. Article according to claim 7, wherein said bonding platforms comprise a material selected to have a coefficient of thermal expansion that is substantially matched to the coefficient of thermal expansion of the optical fiber.

9. Article according to claim 8, wherein said material is INVAR®.

10. Article according to claim 1, wherein said support member comprises a composition selected from the group consisting of the Zr-tungstate-based compositions and the Hf-tungstate-based compositions.

11. Article according to claim 10, wherein said support member further comprises an amount of a positive thermal expansion coefficient material, said amount selected to provide the support member with a desired negative value of the thermal coefficient of expansion.

12. Article according to claim 11, wherein said positive thermal expansion coefficient material is selected from the group consisting of $Al_2O_3$, $SiO_2$, $ZrO_2$, MgO, CaO and $Y_2O_3$.

13. Article according to claim 1, wherein said support member comprises a first negative thermal expansion coefficient member bonded to a second positive thermal expansion coefficient member, said first and second members selected to provide a support member having a desired value of the negative thermal expansion coefficient.

* * * * *

Adverse Decision In Interference

Patent No. 5,694,503, Debra A. Fleming, David W. Johnson Jr., Paul J. Lemaire, ARTICLE COMPRISING A TEMPERATURE COMPENSATED OPTICAL FIBER REFRACTIVE INDEX GRATING, Interference No. 105,253, final judgment adverse to the patentees rendered Oct .14, 2005, as to claims 1-13.

*(Official Gazette, February 14, 2006)*